Sept. 15, 1964  T. W. BERWIN ETAL  3,148,537
DYNA-ELECTRONIC COMPENSATOR

Filed Nov. 26, 1956  3 Sheets-Sheet 1

INVENTORS.
TED W. BERWIN
FREDERICK F. LIU
BY
ATTORNEY

Sept. 15, 1964    T. W. BERWIN ETAL    3,148,537
DYNA-ELECTRONIC COMPENSATOR
Filed Nov. 26, 1956    3 Sheets-Sheet 2

INVENTORS.
TED W. BERWIN
FREDERICK F. LIU
BY
ATTORNEY

Sept. 15, 1964     T. W. BERWIN ETAL     3,148,537

DYNA-ELECTRONIC COMPENSATOR

Filed Nov. 26, 1956     3 Sheets-Sheet 3

INVENTORS.
TED W. BERWIN
FREDERICK F. LIU

BY

*Alan Rothenberg*

ATTORNEY

United States Patent Office 3,148,537
Patented Sept. 15, 1964

3,148,537
DYNA-ELECTRONIC COMPENSATOR
Ted W. Berwin, Encino, and Frederick F. Liu, Northridge, Calif., assignors to North American Aviation, Inc.
Filed Nov. 26, 1956, Ser. No. 624,316
3 Claims. (Cl. 73—71.4)

This invention relates to dyna-electronic compensators and more particularly to apparatus for facilitating the study of transient phenomena in or with dynamic systems.

Transient phenomena in systems such as rocket engines and other high energy power plants are commonly studied by the use of electromechanical pickups. Such pickups whether they be transducers of the capacitance, resistance bridge or any other of the well-known transducer types have a response which is limited by the characteristics of inertia, damping and compliance which are peculiar to the pickup itself. Thus the output of the pickup will be a true representation of the phenomena to be observed only for those phenomena within the linear response range of the pickup. For observations of phenomena involving condition changes which occur at a speed beyond the linear range of the pickup, it has been necessary heretofore either to accept the distortion due to the limited transient response characteristics of the pickup or to perform relatively laborious mathematical computations which take into consideration the transfer function of the pickup.

The present invention will compensate to a high degree for the transient inadequacies of condition responsive transducers and will extend the frequency response as well as the transient response thereof on the order of twenty times or more. The present invention will also automatically and instantaneously reconstruct the true wave form of rapid transient phenomena which may be applied to or sensed by the transducer. Fundamentally, the present invention comprises an electronic system having a transfer function which is the reciprocal of at least one factor of the transfer function of the transducer. The electrical output of the transducer is fed to the input of the compensating network whereby the output of the latter is a true reproduction of the transient phenomena which is applied to the input of the transducer. In one embodiment of the invention the compensating network comprises a high gain negative feedback amplifier wherein the transfer function of the feedback network thereof is made equal to the transfer function of the transducer. In another embodiment the compensating network is caused to have a transfer function which is the inverse of the transducer's transfer function which may include the reciprocal of the sum of a plurality of terms of respectively different differential order. The compensating network is provided with one channel for each term of this sum and each channel successively differentiates the output of the transducer a number of times equal to the order of the differential term individual thereto. The signals from the several channels are combined to provide an output which is a true reproduction of the input to the transducer. The transfer function of the transducer will include constant factors such as inertia, damping ratio and natural frequency which are peculiar to a particular transducer. The compensating network is provided with manually variable control factors corresponding to the several unknown constant factors of the transducer whereby when these variable factors are set to yield a true reproduction of a known transducer input, the setting thereof will directly indicate the transducer characteristics to be determined.

The present invention makes possible the study of transient phenomena on the order of less than a microsecond rise time which heretofore has been difficult if not impossible to achieve by means of electromechanical transducers alone. Furthermore, it provides a simple and accurate means for determining the amplitude and phase responses of dynamic transducers and other damped oscillatory systems such as test stands, thus eliminating the need for the more difficult and time consuming transform methods.

It is an object of this invention to improve the measurement of transient phenomena.

A further object of this invention is to facilitate the study of dynamic systems.

Still another object of this invention is the automatic compensation for the inadequacies of electromechanical transducers.

Another object of this invention is the extension of the frequency range transient response of electromechanical transducers.

Another object of this invention is to facilitate the study of modes and nonlinearities of damped oscillatory systems having one or more degrees of freedom.

Other objects of the invention will become apparent from the following description taken in connection with the accompanying drawings, in which FIG. 1 shows the shape of a fast rising pressure wave which may be reproduced by transducers normally used to study transient phenomena;

Figure 6:
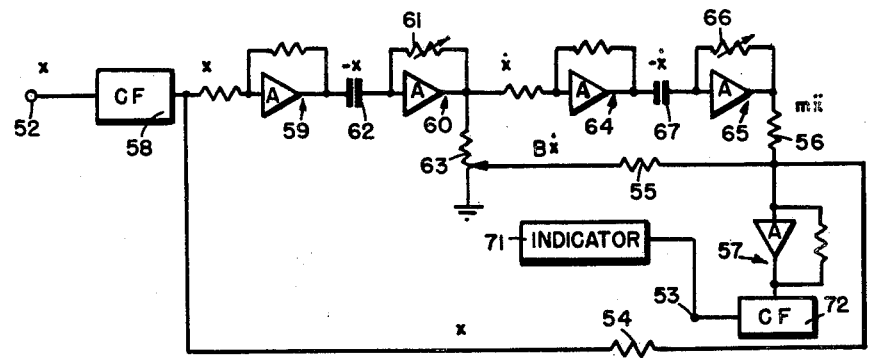
FIG. 6 illustrates a further embodiment of the invention.
Figure 7:
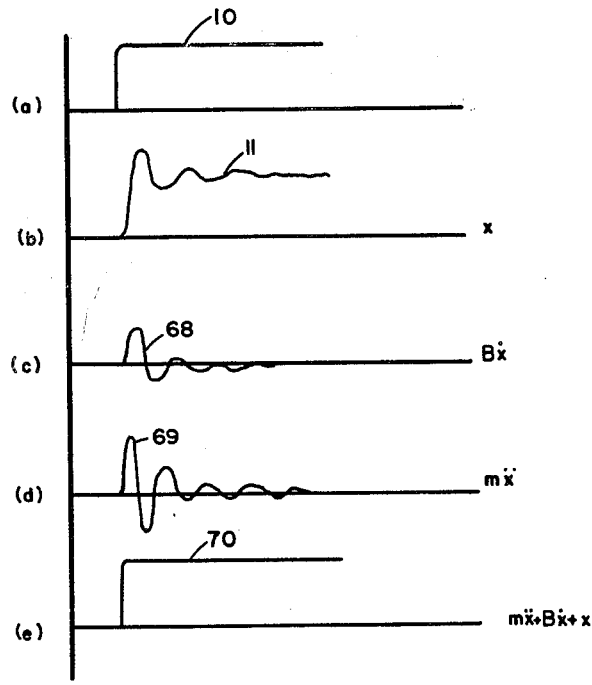

And FIG. 7 illustrates the wave forms which may exist in the apparatus of FIG. 6.

Figure 1:
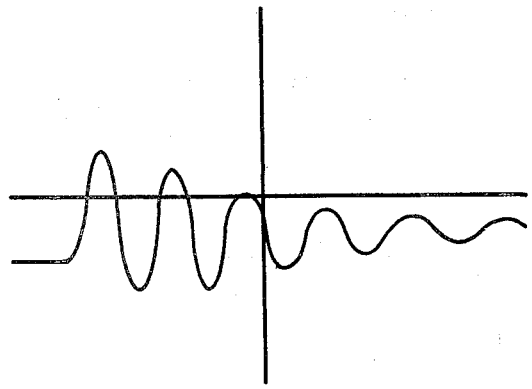

If a step function such as the sharply increasing pressure wave 10 of FIG. 7(a) is applied to the input of a condition responsive pickup such as for example the capacitance type transducer commonly used for measurement of such phenomena, the pickup will have an output or response which is a distorted reproduction of the input phenomena and will generally be of a form indicated in FIG. 1 and at 11 in FIG. 7(b). Evident in wave form 11 is the ringing of the transducer which is due to the fact that the transducer behaves essentially as a damped oscillatory dynamic system having a resonant frequency determined by its inertia and compliance. Such a transducer will have a response X (indicated by the curve 11, FIG. 7(b)) to applied excitation F(t) of the form $$m\ddot{x}+B\dot{x}+x=F(t) \qquad (1)$$

where $\dot{x}$ and $\ddot{x}$ respectively indicate first and second derivatives of $x$, $m$ is a constant indicative of the inertia and compliance of the transducer and B is a constant indicative of the damping ratio thereof. Utilizing Laplace transforms where the symbol L preceding a function indicates the Laplace transform of the function, the Equation 1 may be written as $$L(x)=\frac{1}{ms^2+Bs+1}L[F(t)] \qquad (2)$$

where $s$ may be considered a differential operator indicating the operation of differentiation with respect to time. The transfer function T(s) of the pickup defined by Equation 1 may be written as $$T(s)=\frac{1}{ms^2+Bs+1} \qquad (3)$$

Figure 2:
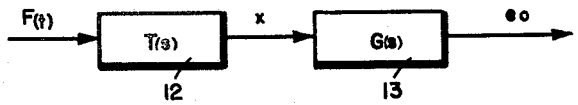
FIG. 2 is a functional diagram which depicts the fundamental operation of the present invention.

Consider the system of FIG. 2 which comprises a transducer 12 having a transfer function $T(s)$ such that it produces a response $x$ to an excitation $F(t)$ applied thereto. The electrical response $x$ is applied to a second system 13 having a transfer function $G(s)$ which produces an output from the system 13 designated as $e_0$. Since the transfer function is the ratio of the output of the system to the input thereof, $x$ will be the resulting distorted signal produced by a transducer having the transfer function $T(s)$ and excited by $F(t)$. When the output $x$ of the transducer is applied to the system 13 having the transfer function $G(s)$ we have the equation $$L(e_0) = L(x)G(s) = L[F(t)][T(s)][G(s)] \quad (4)$$

If $G(s)$ is made equal to the inverse of $T(s)$, $$G(s) = \frac{1}{T(s)} \quad (5)$$

Equation 4 will reduce to $$L(e_0) = L[F(t)] \quad (6)$$

which may be further reduced to $$e_0 = F(t) \quad (7)$$

It will be seen then that the system of FIG. 2 will provide an output $e_0$ which is an exact reproduction of the applied excitation $F(t)$ when the system 13 is made to have a transfer function which is the reciprocal of the transfer of the transducer. That is, the transfer function $G(s)$ of the compensating network 13 must be equal to $$\frac{1}{T(s)}$$

Figure 3:
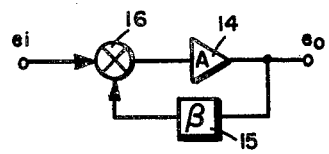
FIG. 3 is a block diagram of one embodiment of the invention.

The negative feedback system of FIG. 3 comprises a negative amplifier 14 having a gain $-A$, and a feedback network 15 having a feedback factor $\beta$ which couples the output of the amplifier to the input thereof through a summing network 16 which may also receive an input signal $e_i$ such as the output $x$ of the transducer. The transfer function of the feedback system of FIG. 3 is $$G(s) = \frac{e_0}{e_i} = \frac{-A}{1 + \beta A} \quad (8)$$

If $\beta A$ is much much greater than one $G(s)$ approaches the limit $$G(s) = \frac{-1}{\beta} \quad (9)$$

It will be seen then that if the feedback factor $\beta$ is made equal to $T(s)$ $$\beta = T(s) \quad (10)$$

the transfer function of $G(s)$ is substantially equal to the reciprocal of the transfer function $T(s)$ of the transducer, $$G(s) = \frac{1}{T(s)} \quad (11)$$

Figure 4:
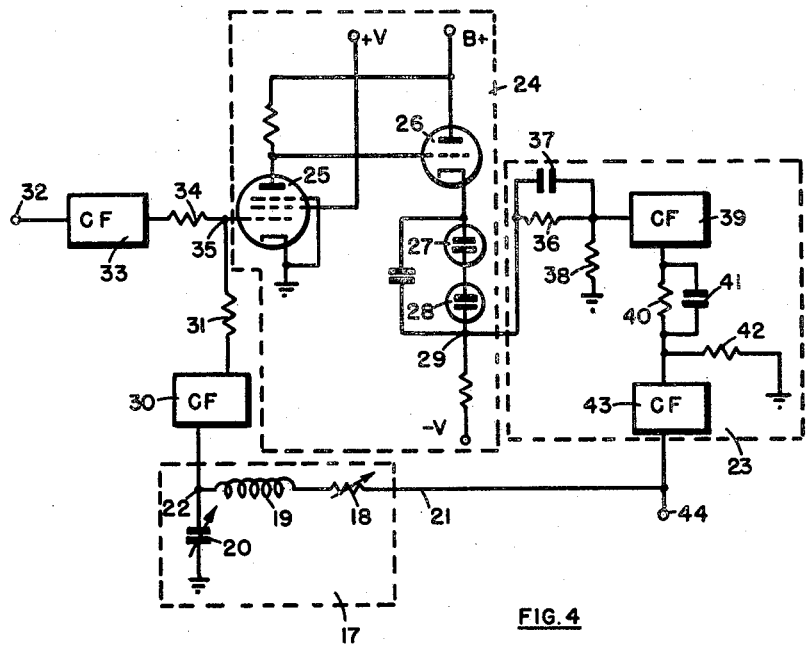
FIG. 4 is a schematic circuit diagram of the apparatus of FIG. 3.

Consider the feedback network shown in the dotted box 17 of FIG. 4 and comprising variable resistor 18, inductance 19 and variable capacitor 20 connected as shown. The transfer function $T'(s)$ of this feedback network, from input terminal 21 to output terminal 22, is $$T'(s) = \frac{1}{LCS^2 + RCS + 1} \quad (12)$$

where L, C and R are the inductance, capacitance and resistance of elements 19, 20 and 18, respectively. If we set $LC = m$ and $RC = B$, the transfer function $T'(s)$ of the feedback network 17 is the same as the transfer function $T(s)$ of the transducer defined in Equation 3. Therefore, the feedback network 17 is an electrical analogue of the electromechanical transducer described by Equation 1.

The circuitry of FIG. 4, except for the components within the dotted box 23 is functionally identical to FIG. 3. The amplifier shown within dotted box 24 is exemplary only and may comprise a pentode 25 having the plate thereof coupled to the grid of a cathode follower 26 which has a pair of regulating tubes 27 and 28 connected in the cathode circuit thereof. The regulating tubes maintain a constant voltage drop between the cathode of tube 26 and the output terminal 29 thereof. Neglecting the circuitry when dotted box 23, the output at terminal 29 of the amplifier is fed through the feedback network 17, through a cathode follower (CF) 30 and one resistor 31 of the resistive summing network to the input 35 of the amplifier. Terminal 32 is adapted to receive the output $x$ of the transducer which is fed through cathode follower 33 and a second resistor 34 of the summing network to the amplifier input.

If the gain (A) of the amplifier 24 is very large then the transfer function of the circuitry just described is very closely $$\frac{-e_0}{e_i} = G(s) = \frac{1}{T(s)} = LCS^2 + RCS + 1 \quad (13)$$

The exact equation of the transfer function is $$\frac{-e_0}{e_i} = \frac{LCS^2 + RCS + 1}{\frac{LCS^2 + RCS + 1}{A/2} + 1} \quad (14)$$

Examination of Equation 14 shows that for stable operation (free of oscillation) the gain A of the amplifier must increase as frequency increases approximately in accordance with the decrease of the feedback factor $\beta$ with increasing frequency. For example, if the gain $A'$ from the input terminal 35 of the amplifier to the input terminal 21 of the feedback network is made approximately equal to $$A' \approx (LCS + 1)^2 A \quad (15)$$

Equation 14 becomes $$-\frac{e_0}{e_i} = \frac{LCS^2 + RCS + 1}{\frac{LCS^2 + RCS + 1}{\frac{A}{2}(LCS^2 + 2LCS + 1)} + 1} \quad (16)$$

It will be seen that Equation 16 is a much closer approximation to Equation 13 than is Equation 14.

This rising gain characteristics may be achieved by the addition of the circuitry within dotted box 23 which passes the output of the cathode follower 26 through a parallel resistance-capacitance network 36, 37, across grounded resistor 38, through a cathode follower 39, through a second parallel resistance-capacitance network 40, 41, across resistor 42 and through cathode follower 43 to the output 44 of the entire compensating network and to the input 21 of the feedback network. It will be seen then that the transfer function of the complete circuit of FIG. 4, the ratio of the output at terminal 44 to the input at terminal 32 very closely approximates $LCS^2 + RCS + 1$ which, (with the proper choice of L, C and R, as explained above) is equal to the inverse of the transfer function of the transducer under consideration. Thus, the signal appearing at output terminal 44 will be a true electrical reproduction of a transient dynamic signal applied to a transducer which has the electrical output thereof fed to terminal 32 of the compensating network.

It will be readily appreciated that the principles of this invention may also be applied to transducers or other dynamic systems having a transfer function other than that of Equation 3 and may be applied to the study of more complex systems such as those having more than one degree of freedom and having transfer functions which are defined by differential equations of other than the second order. In order to compensate for the distortion due to a dynamic system having any predetermined transfer function it is simply necessary to provide in a circuit such as that of FIG. 4 a feedback network (such as network 17, for example) having a transfer function which is equal to such predetermined transfer function.

It will be readily appreciated that the principles of the invention described above are readily adaptable to the study of the characteristics of the transducer itself and of other damped oscillatory dynamic systems such as test stands. For example, in order to determine the constant factors $m$ and $B$ of Equation 1 which define the resonant frequency and damping ratio of the transducer, a known excitation may be applied to the transducer and the output of the transducer applied to the input of the compensator. Resistance 18 and capacitance 20 which are the variable factors of the compensating network corresponding to the constant factors characteristic of the transducer may be manually varied until the output of the compensator is a true reproduction of the known excitation applied to the transducer. The setting of the resistor and capacitor together with the value of the inductance will then indicate the constant factors $B$ and $m$ of the transducer since $B$ is directly related to $RC$ and $m$ is directly related to $LC$.

The frequency response of the transducer may be studied, for example, by applying a varying frequency oscillation to the transducer, applying the output of the transducer to the compensating network and comparing the output of the compensating network (a true reproduction of the input to the transducer) with the actual output of the transducer. Furthermore, it will be seen that with the simple adjustment of the feedback network 17, electrical simulation of any linear system with one degree of freedom may be provided.

Figure 5:
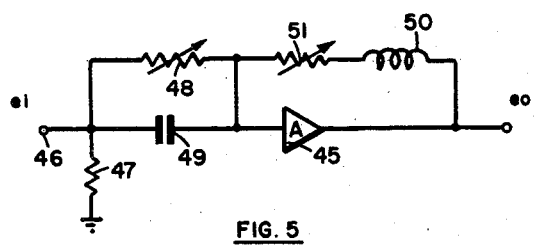
FIG. 5 illustrates a second embodiment of the invention.

The circuitry of FIG. 4 is exemplary only of several networks which may be arranged to provide a desired transfer function which is the inverse of a predetermined transfer function. For example, the network of FIG. 5 is another circuit which will provide the desired transfer function. The compensator of FIG. 5 comprises a negative amplifier 45 to which the output of the transducer may be fed at terminal 46 across resistor 47 and through parallel resistance-capacitance network 48, 49 together with a feedback signal through a feedback network comprising inductance 50 and resistance 51. The transfer function of the network of FIG. 5 is $$-\frac{e_0}{e_i} = \frac{LCS^2 + \left(R_2C + \frac{L}{R_1}\right)s + 1}{\frac{(LC)}{(A)}s^2 + \left(\frac{R^2C + \frac{L}{R_1}}{A}\right)s + 1} \quad (17)$$

wherein $R_1$ is variable resistor 48, $R_2$ is variable resistor 51, $L$ is the inductance of inductor 50 and $C$ is the capacitance of capacitor 49.

As in the circuit of FIG. 4, the gain $A$ of amplifier 45 should approximately increase with frequency for stability as shown in Equation 15. The transfer function of the circuit of FIG. 5 then becomes very closely (if $R_1 = R_2$)

$$-\frac{e_0}{e_i} = G(s) = \frac{1}{T(s)} = LCS^2 + \left(RC + \frac{L}{R}\right)s + 1 \quad (18)$$

Still another network which will have a transfer function which is the inverse of the transfer function of Equation 3 is shown in FIG. 6. The circuitry of this compensating network is derived by means of an approach which is different and perhaps more direct than the approach utilized in the derivation of the circuits of FIGS. 4 and 5 but nevertheless provides a compensating network which is essentially similar in operation to those of FIGS. 4 and 5. With input $x$ at terminal 52 as defined by Equation 1 the output of the network of FIG. 6 at terminal 53 will be $m\ddot{x} + B\dot{x} + x$ which is equal to $F(t)$, the excitation applied to the transducer, whereby it may be seen that the transfer function of this circuit is the inverse of the transfer function of the transducer. Essentially the circuit electronically performs the mathematical operations indicated by the left side of Equation 1. The circuit includes one channel for each term of the left side of Equation 1 and each channel performs the number of differentiations indicated by the differential order of the term which is individual thereto and multiplies by the appropriate constant. The output of the three channels are summed to provide an output of the circuit which is a true reproduction of the transient phenomena under consideration.

The output $x$ of the transducer is applied at terminal 52 and fed through a first channel including cathode follower 58 directly to a summing amplifier comprising resistors 54, 55 and 56 and operational amplifier 57. The output of the compensating system is obtained at output terminal 53 of cathode follower 72 coupled to the output of the summing amplifier. The input is also fed from a cathode follower 58 through an operational amplifier 59 which provides the signal negative $x$ at the output thereof. The signal negative $x$ is fed to a differentiator comprising amplifier 60, variable feedback resistor 61, and capacitor 62 to provide the signal $\dot{x}$. The signal $B\dot{x}$ is derived from a variable resistor or potentiometer 63 which introduces the factor "B" and is coupled between ground and the output of amplifier 60. The signal $B\dot{x}$ is the second signal fed to the summing amplifier. The signal $\dot{x}$ is further fed through the third channel comprising operational amplifier 64 to produce the signal negative $\dot{x}$ which is fed to a second differentiator comprising amplifier 65, variable feedback resistor 66 and capacitor 67. Variation of resistor 66 (or resistors 61 and 66) introduces the multiplying factor "$m$" to provide at the output of amplifier 65 to signal positive $m\ddot{x}$ which is the third signal fed to the input of the summing amplifier. Thus the three channels of the circuit of FIG. 6 have outputs which are respectively indicated in FIG. 7 as curve 11 ($\dot{x}$), curve 68 ($B\dot{x}$) and curve 69 ($m\ddot{x}$). The summing amplifier adds to the output of the transducer to its first and second derivatives to provide the wave form 70 at terminal 53 which is equal to $m\ddot{x} + B\dot{x} + x$ and is thus an exact electrical reproduction of the input to the transducer. The waveform 70 may be indicated on any suitable indicator 71.

As in the circuits of FIGS. 4 and 5, the variable components 63 and 66 of FIG. 6 correspond to the constant factors $B$ and $m$ of the transducer whereby the characteristics of the transducer may be studied in the manner described in connection with FIG. 4. Furthermore, the compensator of FIG. 6 may be simply modified to compensate for the distortion due to systems of greater or lesser complexity. For example, the compensator would handle a system having a response of first differential order merely by disconnecting the second order channel including amplifier 65. For a more complex system a third order differential term may be added by providing a channel for differentiating the second order signal $m\ddot{x}$ and adding a fourth input to the summing amplifier.

The principles of this invention as described above may be utilized for the study of more complex vibratory dynamic systems such as for example a system having a transfer function defined by $$T(s) = \frac{1}{(ms^2 + Bs + 1)(m_2s^2B_2s + 1)} \quad (19)$$

where $m_2$ and $B_2$ are other constants peculiar to the system. If the transfer function $G(s)$ of the compensator is made equal to the reciprocal of either factor of the function $T(s)$, that is, for example, if $$G(s) = ms^2 + Bs + 1 \quad (20)$$

then the output of the compensator will be a true indication of that portion of the transfer function of the system under consideration which is indicated by $$\frac{1}{m_2s^2 + B_2s + 1}$$

which is the other factor of the function $T(s)$.

The output of any of the described compensating systems may be indicated or displayed by conventional means such as a recorder or oscilloscope 71 of FIG. 6 as will be readily apparent to those skilled in the art.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for reproducing the true waveform of unknown transient motion phenomena comprising an electro-mechanical pickup adapted to sense said phenomena and provide an electrical output which is a non-linear function of the sensed phenomena, said pickup having an inertia and compliance and damping; an indicating device; and a compensating network coupled to transmit the output of said transducer to said device, said network comprising an input terminal coupled with said transducer, a summing amplifier having an output terminal coupled with said device, said amplifier having a first input terminal coupled with said network input terminal and having second and third input terminals, a first order channel having a first differentiating amplifier coupled between said network input terminal and said second summing amplifier input terminal, a second order channel including a second differentiating amplifier coupled between said first differentiated amplifier and said third summing amplifier input terminal, said first order channel having a variable resistor adjusted to provide a gain proportional to said damping, said second order channel amplifier having a variable feedback resistor adjusted to provide a gain proportional to said inertia and compliance.

2. Apparatus for reproducing the true waveform of unknown and transient vibratory or pressure phenomena comprising a mechanical to electrical pickup adapted to sense said phenomena and provide an electrical output which is a non-linear function of the sensed phenomena, said pickup having an inertia and compliance and damping ratio; a first differentiator comprising a capacitor having one side thereof coupled to the output of said pickup, an amplifier having a variable feedback resistor, a potentiometer, said amplifier having an input from said capacitor and an output to said potentiometer; a second differentiator comprising a second amplifier having a second variable feedback resistor, a second capacitor coupling the output of said first amplifier to the input of said second amplifier; a summing amplifier having inputs from said pickup and from said differentiating amplifiers; an indicating device having an input from said summing amplifier; said potentiometer and feedback resistors being adjusted to cause the outputs of said potentiometer and second amplifier to be proportional to said damping ratio and to said inertia and compliance of said pickup.

3. In combination, a device whose dynamic characteristics can be expressed by a second order differential equation, and an apparatus for modifying and correcting the output of said device, said apparatus comprising a first differentiating unit for differentiating the device output and polarity reversing means connected to the differentiating unit, said differentiating unit and polarity reversing means operating jointly to produce a differentiated signal whose polarity is the same as that of the device output, a first means for performing a mathematical operation on said jointly produced signal comprising means for multiplying said jointly produced signal by a quantity which is indicative of the damping ratio, a second means for performing mathematical operations on the output from the differentiating unit comprising a second differentiating unit for differentiating the differentiated output a second time and a means for multiplying said twice differentiated output by a quantity indicative of the inertia and compliance of the device and means for summing the outputs of the two said multiplying means with the original output of the device to provide a compensated output for said device.

References Cited in the file of this patent
UNITED STATES PATENTS

| | | |
|---|---|---|
| 1,535,538 | Maxfield et al. | Apr. 28, 1925 |
| 2,075,956 | Payne | Apr. 6, 1937 |
| 2,266,168 | Crabtree | Dec. 16, 1941 |
| 2,400,571 | Olesen | May 21, 1946 |
| 2,412,227 | Och et al. | Dec. 10, 1946 |
| 2,417,974 | Downs et al. | Mar. 25, 1947 |
| 2,482,081 | Unger | Sept. 13, 1949 |
| 2,776,410 | Guanella | Jan. 1, 1957 |
| 2,811,591 | Kennedy | Oct. 29, 1957 |
| 2,904,681 | Jones et al. | Sept. 15, 1959 |
| 2,959,347 | Kearns | Nov. 8, 1960 |

OTHER REFERENCES

Proceedings of the I.R.E., May 1947 ("Analysis of Problems in Dynamics by Electronic Circuits," by Ragazzini et al.), pp. 444–452.

Publication—Wireless Engineer—article by Gouriet, pp. 112–123 of May 1953 issue.

Publication—Electronics—Article by Honnell on pages 178 and 179 of June 1954 issue.